United States Patent
Matsuki

(10) Patent No.: US 9,148,934 B2
(45) Date of Patent: Sep. 29, 2015

(54) LIGHT CONTROL SYSTEM

(71) Applicant: OLYMPUS CORPORATION, Tokyo (JP)

(72) Inventor: Kaoru Matsuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/463,717

(22) Filed: Aug. 20, 2014

(65) Prior Publication Data

US 2014/0354184 A1    Dec. 4, 2014

Related U.S. Application Data

(63) Continuation of application No. PCT/JP2013/057365, filed on Mar. 15, 2013.

(30) Foreign Application Priority Data

Apr. 24, 2012 (JP) ................. 2012-098922

(51) Int. Cl.
*H05B 37/02* (2006.01)
*G09G 3/36* (2006.01)
(Continued)

(52) U.S. Cl.
CPC *H05B 37/02* (2013.01); *G03B 3/10* (2013.01); *G03B 9/02* (2013.01); *G03B 11/00* (2013.01); *G09G 3/3648* (2013.01); *G03B 2205/0069* (2013.01)

(58) Field of Classification Search
USPC ............. 345/204, 211–214, 102, 77–82, 88
See application file for complete search history.

(56) References Cited

U.S. PATENT DOCUMENTS 8,475,064 B2    7/2013  Bai et al.
2012/0076486 A1  3/2012  Bai et al.
(Continued)

FOREIGN PATENT DOCUMENTS

JP    Sho 55-152755 U    11/1980
JP    Hei 08-019239 A    1/1996
(Continued)

OTHER PUBLICATIONS

English translation of International Preliminary Report on Patentability together with the Written Opinion dated Nov. 6, 2014 received in related International Application No. PCT/JP2013/057365.
(Continued)

*Primary Examiner* — Tuyet Vo
(74) *Attorney, Agent, or Firm* — Scully, Scott, Murphy & Presser, PC

(57) ABSTRACT

The light control system includes command means (640) for outputting a command signal indicating a direction of rotation of the light control means (300), detection means (630) for detecting electromotive force generated in a coil (510), switch means (610) for connecting the coil to drive means (500, 302, 620) in a driving state in which current is supplied to the coil and connecting the coil to the detection means in a non-driving state in which electromotive force generated in the coil is detected, determination means (660) for determining a rotational state of a rotary shaft member (302), based on an output signal output from the detection means, and control means (650) for outputting a command for causing the drive means to output a drive signal, based on an output signal output from the determination means.

4 Claims, 5 Drawing Sheets

(51) Int. Cl.
  *G03B 9/02* (2006.01)
  *G03B 3/10* (2006.01)
  *G03B 11/00* (2006.01)

(56) References Cited

U.S. PATENT DOCUMENTS

2014/0340376 A1* 11/2014 Itagaki et al. .................. 345/211
2015/0130990 A1* 5/2015 Cho et al. ...................... 348/357

FOREIGN PATENT DOCUMENTS

JP  Hei 10-020360 A  1/1998
JP  2012-073383 A  4/2012

OTHER PUBLICATIONS

International Search Report dated Jun. 18, 2013 issued in PCT/JP2013/057365.

* cited by examiner

LIGHT CONTROL SYSTEM

CROSS-REFERENCE TO RELATED APPLICATIONS

The present application is a continuation application of International application No. PCT/JP2013/057365 filed on Mar. 15, 2013, which is based upon and claims the benefit of priority from the prior Japanese Patent Application No. 2012-098922 filed on Apr. 24, 2012; the entire contents of these applications are incorporated herein by reference.

BACKGROUND OF THE INVENTION

1. Field of the Invention

The present invention relates to alight control system.

2. Description of the Related Art

With enhancement of image quality of small-size image pickup devices such as mobile devices having image pickup function and micro video scopes in recent years, there are increasing needs for optical elements such as lenses, stops, and optical filters to shift from fixed focal length lenses, fixed aperture stops, filters having fixed characteristics used in the past to adjustable focus lenses, variable stops, and variable characteristic filters. Moreover, many light control systems have been developed as means for reducing the size of optical components used in small-size image pickup devices.

Japanese Patent Application Laid-open Publication No. H10-20360 discloses a light quantity control apparatus as an example of such light control systems. FIG. 5 is an exploded perspective view showing the overall construction of a conventional light quantity control apparatus.

The light quantity control apparatus shown in FIG. 5 has a printed board having a multi-layer structure and a coil having a film core made of a material having high magnetic permeability provided on the printed board. A cylindrical rotor 920 magnetized to have at least two magnetic poles is fitted to the coil part 925 having the above-described structure, and a stop blade 915 used to control the transmitted light quantity is fixedly attached to the rotor 920. The stop blade 915 is arranged between upper and lower plates 910, 911 and shifted in the gap between the upper and lower plates 910, 911 by the coil formed on the printed board.

SUMMARY OF THE INVENTION

A light control system according to the present invention comprises first and second substrates each having an optical aperture; at least one light control means provided with a magnetic rotary shaft member; a spacer arranged between the first substrate and the second substrate to provide a space that allows the light control means to move; drive means arranged on the first substrate, for causing the light control means to move with supply of current to a coil; command means for outputting a command signal indicating a direction of rotation of the light control means; detection means for detecting electromotive force generated in the coil; switch means for connecting the coil to the drive means in a driving state in which current is supplied to the coil and connecting the coil to the detection means in a non-driving state in which electromotive force generated in the coil is detected; determination means for determining a rotational state of the rotary shaft member, based on an output signal output from the detection means; and control means for outputting a command for causing the drive means to output a drive signal, based on an output signal output from the determination means.

It is preferred that the light control system according to the present invention have memory means for storing an output from the command means and that when a signal output from the determination means is input to the control means, a signal output from the control means be determined based on information stored in the memory means.

In the light control system according to the present invention, it is preferred that when power of the light control system is turned on, the command means send a command signal to the control means so as to cause the light control means to shift to a first stopping position.

DETAILED DESCRIPTION OF THE INVENTION

In the following, embodiments of the light control system according to the present invention will be described in detail. It is to be understood the present invention is not limited by the following embodiments.

First Embodiment

Figure 1:
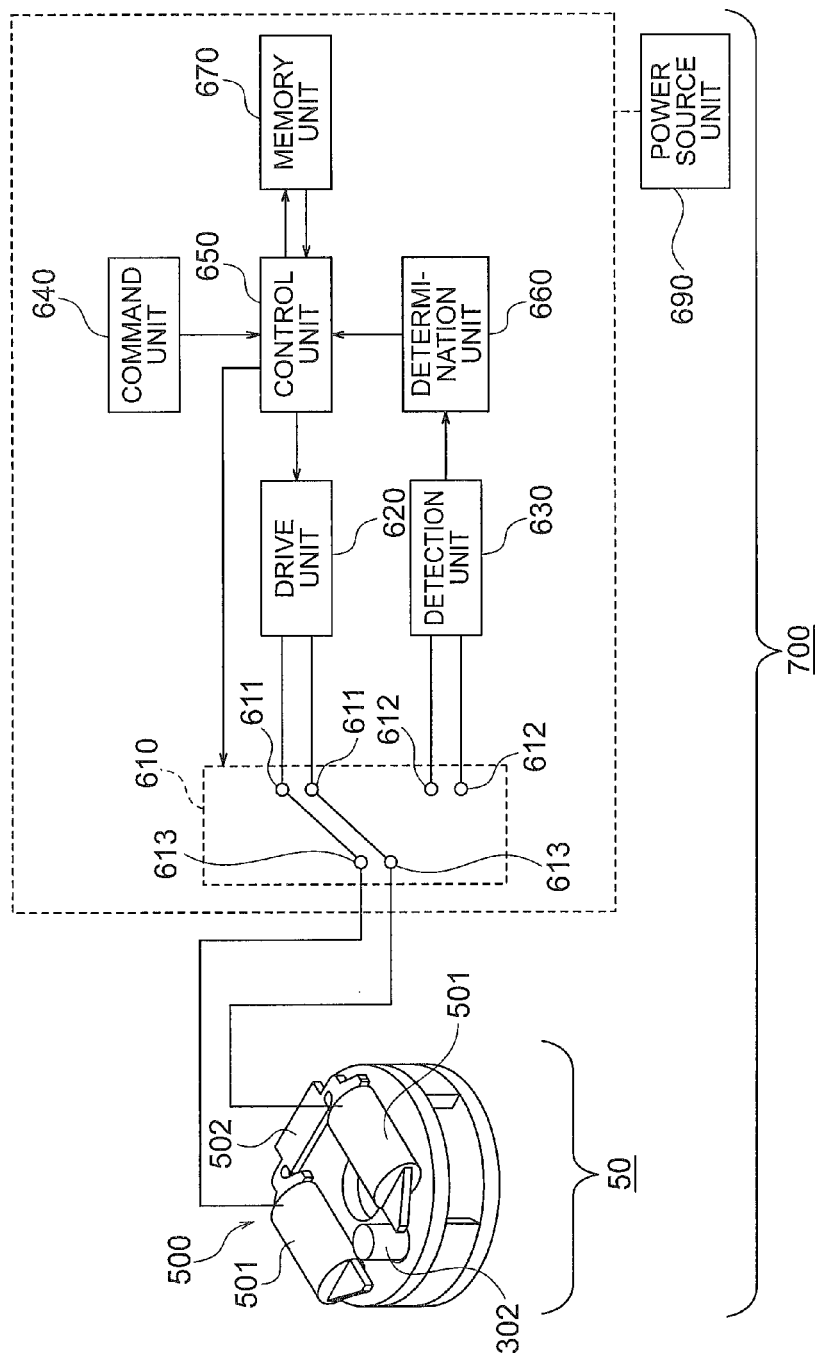
FIG. 1 is a diagram showing the construction of a light control system according to a first embodiment.

A light control system according to a first embodiment will be described with reference to FIGS. 1 to 3. FIG. 1 is a diagram showing the construction of the light control system 700 according to the first embodiment.

As shown in FIG. 1, the light control system according to the first embodiment includes a light control apparatus 50, a switch 610 serving as the switching means, a drive unit 620, a detection unit 630 serving as the detection means, a command unit 640 serving as the command means, a control unit 650 serving as the control means, a determination unit 660 serving as the determination means, a memory unit 670, and a power source unit 690 (power source).

Firstly, the structure of the light control apparatus 50 will be described with reference to FIGS. 2 and 3. FIG. 2 is an exploded perspective view showing the structure of the light control apparatus 50 according to the first embodiment. FIG. 3 is a perspective view showing the structure of the light control apparatus 50 in the assembled state.

Figure 2:
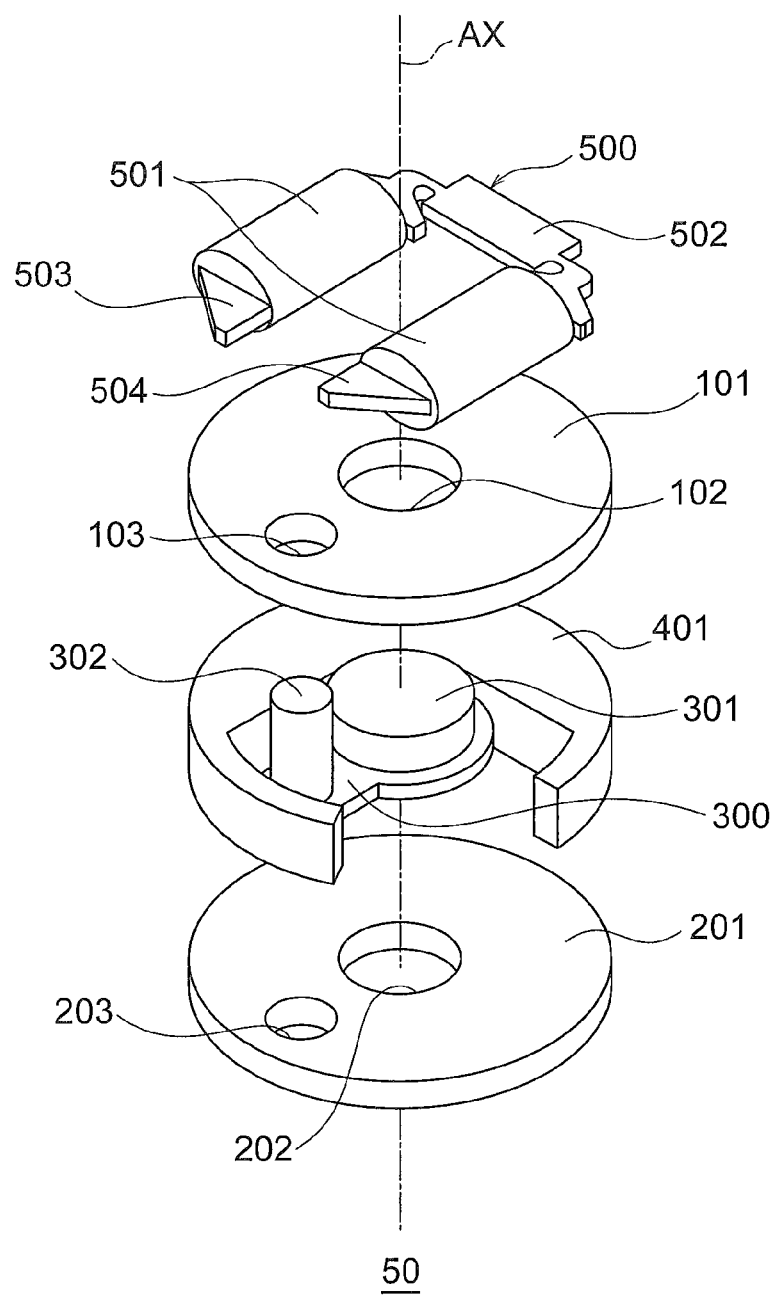
FIG. 2 is an exploded perspective view showing the structure of the light control apparatus according to the first embodiment.
Figure 3:
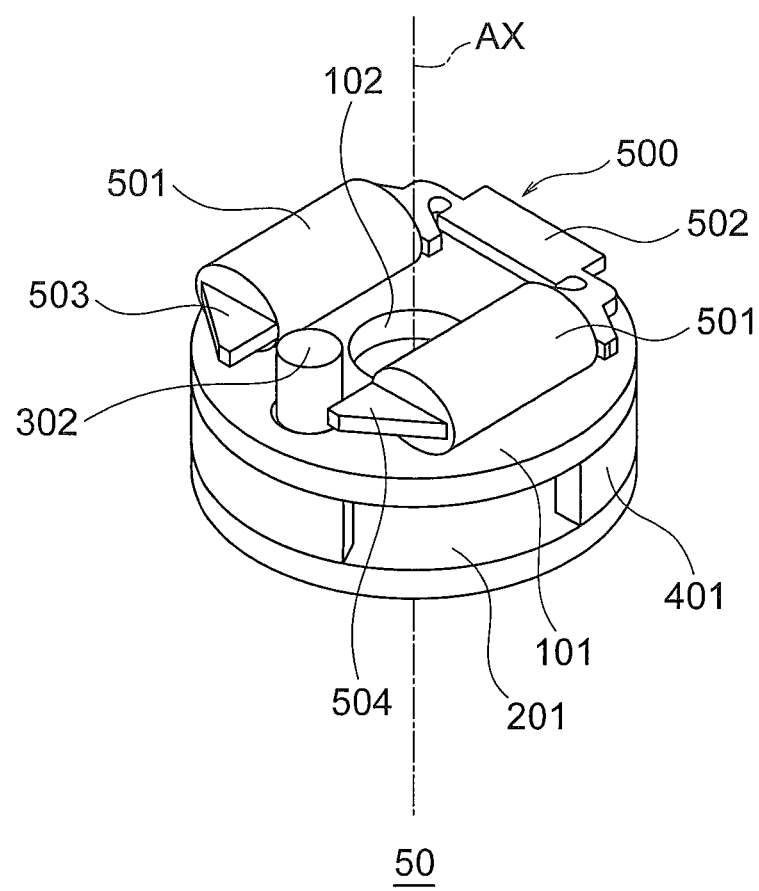
FIG. 3 is a perspective view showing the structure of the light control apparatus according to the first embodiment in the assembled state.

As shown in FIGS. 2 and 3, the light control apparatus 50 includes a first substrate 101 having an optical aperture 102 and a rotary shaft hole 103, a second substrate 201 having an optical aperture 202 and a rotary shaft hole 203, light control means 300 on which an optical element 301 is arranged, a spacer 401 arranged between the first substrate 101 and the second substrate 201 to provide a space in which the light control means 300 can move, and an electromagnetic drive source 500 that causes the light control means 300 to move.

The first substrate 101 and the second substrate 201 are arranged in order along the optical axis AX in such a way that the optical aperture 102 provided at the center of the first substrate 101 and the optical aperture 202 provided at the center of the second substrate 201 are positioned coaxially on the optical axis AX.

A magnetic rotary shaft member 302 is directly provided on the light control means 300 at its rotation center. As the rotary shaft member 302, a magnet is used, for example.

The light control means 300 is arranged between the first substrate 101 and the second substrate 201. The rotary shaft member 302 extends along the optical axis AX with its lower end being rotatably fitted to the rotary shaft hole 203 of the second substrate 201 and its upper end passing through the rotary shaft hole 103 of the first substrate 101 in a rotatable manner. The light control means 300 swings around the rotary shaft member 302. In the case where an optical aperture is provided as the optical element 301, the optical element 301 functions as an optical stop. Examples of the optical element 301 include an optical aperture, a lens, and a filter. There may be provided a plurality of optical means 300.

The electromagnetic drive source 500 is arranged on the first substrate 101 and includes a yoke member 502 having a substantially square U-shape and two winding coils 501 (coil) wound thereon. The two end portions 503, 504 of the yoke member 502 are opposed to the rotary shaft member 302.

Next, the components in the light control system 700 other than the light control apparatus 50 will be described.

As shown in FIG. 1, the switch 610 has a first terminal 611 connected to the drive unit 620, a second terminal 612 connected to the detection unit 630, and a third terminal 613 connected to the winding coil 501 of the electromagnetic drive source 500 and selectively switches connection of one of the first terminal 611 and the second terminal 612 with the third terminal 613. Specifically, the switch 610 electrically connects the drive unit 620 and the winding coils 501 in the driving state in which current is supplied to the winding coils 501. On the other hand, the switch 610 electrically connects the detection unit 630 and the winding coils 501 in the non-driving state in which the electromotive force generated in the winding coils 501 is detected. The non-driving state refers to the state in which driving current is not supplied to the winding coils 501. As will be described later, the status of the system automatically shifts to the non-driving state when supply of current in the driving state is terminated.

Switching of the connection to the first terminal 611 is effected, for example, in response to a control signal that the control unit 650 sends when a command signal is sent from the command unit 640 to the control unit 650. Switching of the connection to the second terminal 612 is effected, for example, either automatically when the signal input from the driving unit 620 stops or in response to a control signal sent from the control unit 650.

The command unit 640 sends a command signal indicating a direction of swinging of the light control means 300 to the control unit 650.

The detection unit 630 detects electromotive force generated in the winding coils 501 responsive to rotation of the rotary shaft member 302.

The determination unit 660 determines the rotational state of the rotary shaft member 302 on the basis of an output signal output from the detection unit 630. The rotational state mentioned above includes the direction of rotation and the rotation speed. Whether the light control means 300 is rotating or not can be determined based on the rotation speed.

Based on an output signal output from the detection unit 660, the control unit 650 sends a command signal to the drive unit 620 to cause it to output a drive signal for driving the electromagnetic drive source 500.

The drive unit 620 supplies, in accordance with the command signal commanding the drive unit 620 to output a drive signal sent from the control unit 650, the winding coils 501 of the electromagnetic drive source 500 with a drive signal for rotating the light control means.

The memory unit 670 is for example, a non-volatile or volatile memory using a semiconductor device, which stores information necessary for the operation of the light control system. The information stored therein is referred to by the control unit 650 in various processing.

The electromagnetic drive source 500, the rotary shaft member 302, and the drive unit 620 constitute the drive means. The light control means 300 is driven by the drive means. More specifically, as certain current is supplied as a driving signal to the winding coils 501 from the drive unit 620, the rotary shaft member 302 disposed between the end portions 503, 504 rotates about its axis. With this rotation, the light control means 300 swings around the rotary shaft member 302 as the pivot to move in a plane perpendicular to the optical axis AX between a first stopping position and a second stopping position, whereby the position of the optical element 301 is changed to control incident light passing through the optical aperture of the light control apparatus 50.

When the light control means 300 is at the first stopping position, the optical element 301 is located at a position at which it is kept away from the optical aperture 102 of the first substrate 101 and the optical aperture 202 of the second substrate 201. In this state, the light control means 300 abuts on the inner wall of the spacer 401 to be kept stationary at the position. In this state, the optical aperture 102 provided in the first substrate 101 or the optical aperture 202 provided in the second substrate 201 constitutes the optical aperture of the light control apparatus 50.

On the other hand, when the light control means 300 is at the second stopping position, the optical element 301 is located at a position at which it overlaps the optical aperture 102 of the first substrate 101 and the optical aperture 202 of the second substrate 201. In this state, the light control means 300 abuts on the inner wall of the spacer 401 to be kept stationary at the position. In this state, in the case where the optical element 301 is a stop, the optical aperture of the light control apparatus 50 is defined by the optical element 301 provided on the light control means 300.

The winding coils 501 cause the rotary shaft member 302 to rotate with supply of certain current when the light control apparatus 50 is in the driving state, and generates electromotive force responsive to the rotation of the rotary shaft member 302 when the light control apparatus 50 is in the non-driving state. In other words, the same winding coils 501 are used for driving of the light control means 300 and detection of the rotation. Therefore, the light control system 700 enables driving and rotation detection without an increase in the size of the light control apparatus 50.

While in the light control apparatus 50 according to the first embodiment the spacer 401 also functions as a stopper that determines the stopping positions of the light control means 300, a stopper member may be provided separately.

Figure 4:
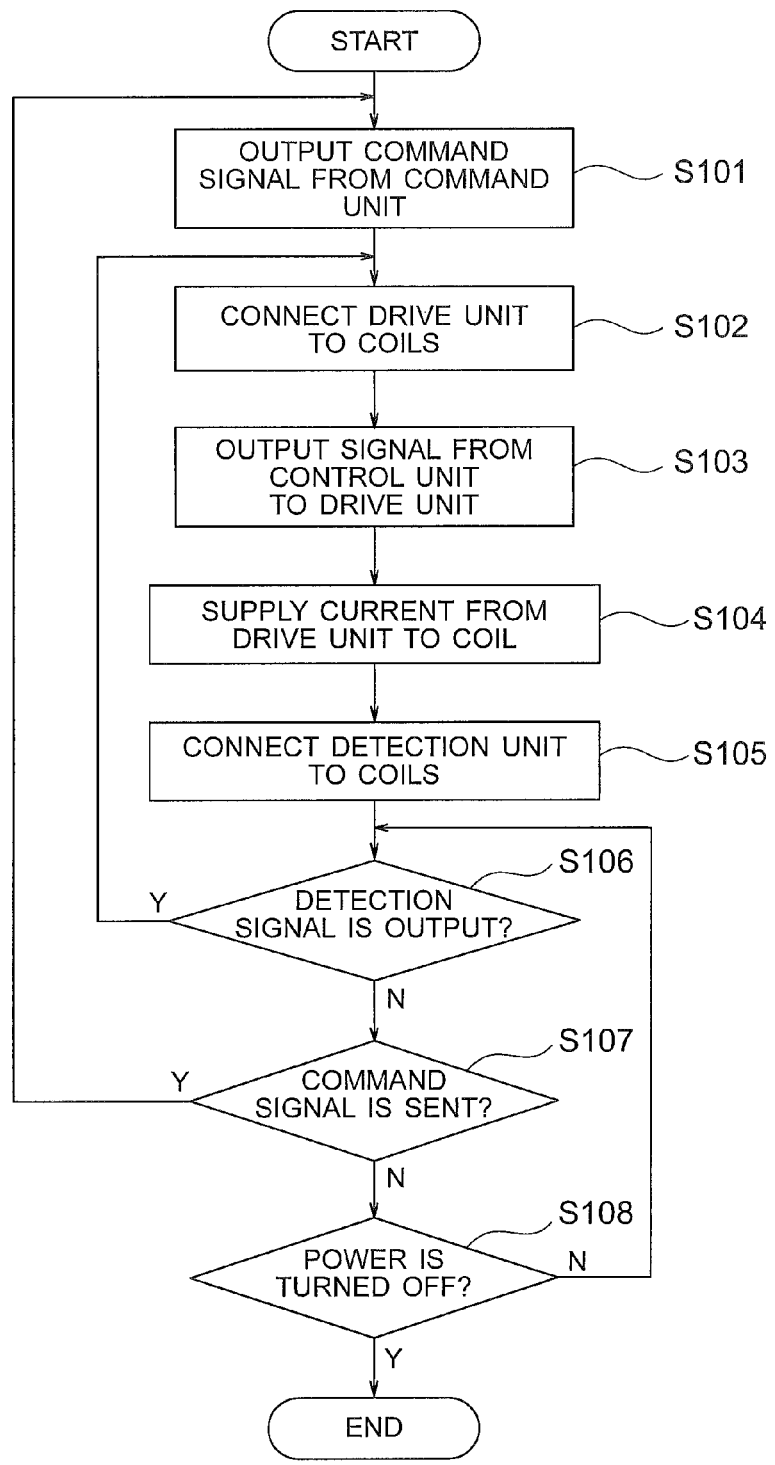
FIG. 4 is a flow chart of a processing sequence of the light control system according to the first embodiment.
Figure 5:
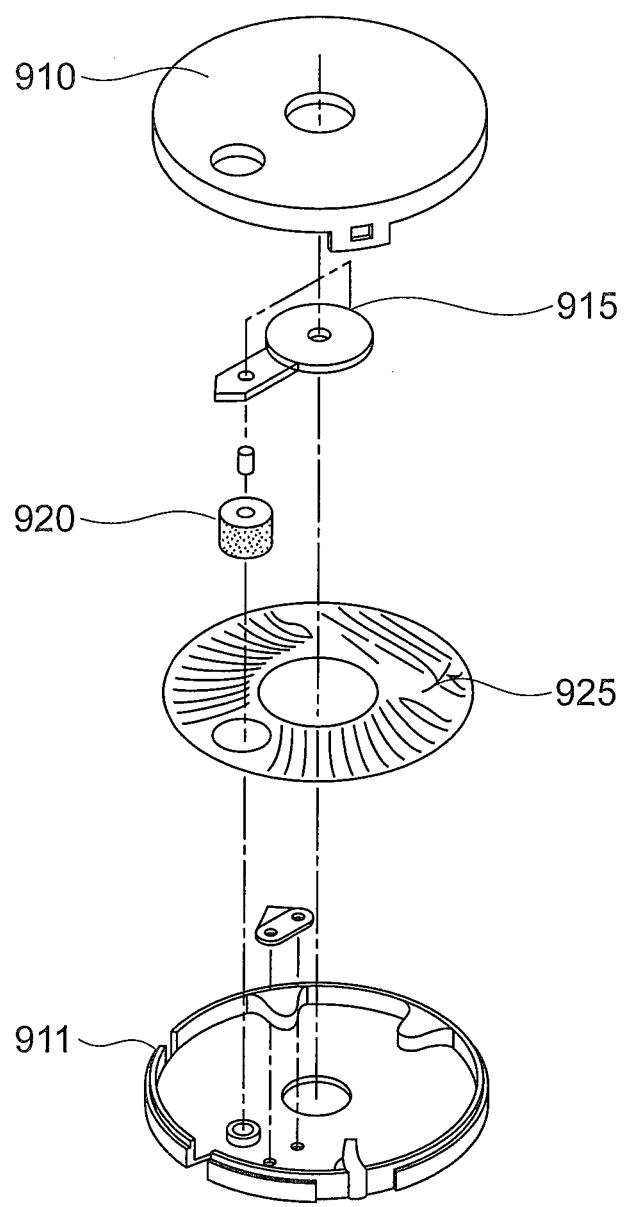
FIG. 5 is an exploded perspective view showing the overall construction of a conventional light control apparatus.

The operation of the light control system 700 will be described with reference to FIG. 4. FIG. 4 is a flow chart showing a processing sequence in the light control system 700.

Firstly, the command unit 640 sends a command signal for driving the light control means 300 to the control unit 650 (step S101). This command signal indicates the direction of swinging (or the direction of shift) of the light control means 300.

Then, the switch 610 connects the first terminal 611 with the third terminal 613 responsive to a control signal from the control unit 650 to thereby connect the driving unit 620 to the winding coils 501 (step S102). This control signal is a signal indicating that the apparatus is in the driving state.

Thereafter, the control unit 650 sends an output signal, which commands the drive unit 620 to output a drive signal, to the drive unit (step S103). This output signal contains information about the electric energy to be supplied and the power supply time.

Receiving the output signal, the driving unit 620 supplies current to the winding coils 501 on the basis of the output signal (step S104). The supply of current is terminated automatically after the lapse of the power supply time indicated by the output signal.

After the supply of current is terminated, the control unit 650 determines that the apparatus is in the non-driving state and sends a control signal to the switch 610. Receiving this control signal, the switch 610 automatically switches the destination of connection of the third terminal 613 to the second terminal 612 to thereby connect the detection unit 630 to the winding coils 501 (step S105). This enables the detection unit 630 to detect or measure electromotive force generated in the winding coils 501 when the light control means 300 moves.

In connection with the above, the control unit 650 may determine that the apparatus is in the non-driving state in response to either the termination of the supply of current to the winding coils 501 or detection of the lapse of a predetermined time after the termination of the supply of current.

If the light control means 300 moves with rotation of the rotary shaft member 302 in the state in which the driving signal is not supplied from the drive unit 620 to the winding coils 501 of the light control apparatus 50, electromotive force is generated in the winding coils 501 by the rotation of the rotary shaft member 302, so that a little electric current flows in the winding coils 501. When detecting this electromotive force, the detection unit 630 outputs a detection signal. The determination unit 660 makes a determination as to this detection signal.

If the determination unit 660 determines that a detection signal is output (Y in step S106), the switch 610 switches the terminal responsive to a control signal sent from the control unit 650 to connect the drive unit 620 to the coils 501 (step S102). Thereafter, subsequent processing (step S103 and subsequent steps) is executed to position the light control means at a predetermined position.

The detection signal output from the detection unit 630 changes depending on the direction of rotation of the rotary shaft member 302. For example, a positive signal is output when the rotation is clockwise, and a negative signal is output when the rotation is counterclockwise. Therefore, the determination unit 660 determines the magnitude of the signal and whether the signal is positive or negative, thereby capable of notifying the control unit 650 of the direction in which the light control means 300 is to be swung to the predetermined position.

On the other hand, if a detection signal is not output (N in step S106), the control unit 650 determines whether or not a command signal is sent from the command unit 640 (step S107).

If a command signal is sent (Y in step S107), the control unit 650 receives the command signal output from the command unit 640 (step S101).

On the other hand, if a command signal is not sent (N in step S107), the control unit 650 checks the state of the power source unit 690 (power source). If the power source is off (Y in step S108), the process is terminated.

If the power source is not off (N in step S108), a determination as to whether a detection signal is output or not is made again, and the processing of step S106 and subsequent steps is executed.

In the above-described light control system, if the light control means 300 swings due to a load such as an impact, it is possible to move it back to a predetermined position by detecting electromotive force generated in the winding coils 501 with the swinging. Thus, a stable operation can be achieved.

Second Embodiment

A light control system according to a second embodiment has a construction same as the light control system according to the first embodiment shown in FIGS. 1 to 3 except for the features described in the following and executes processing similar to the processing according to the flow chart in FIG. 4.

In the light control system according to the second embodiment, a command signal sent from the command unit 640 to the control unit 650 (in step S101 in FIG. 4) is stored in the memory unit 670 serving as memory means. It is preferred that the storing of the command signal in the memory unit 670 be executed in step S103 in FIG. 4.

If the determination unit 660 determines that a detection signal is output from the detection unit 630 while the light control apparatus 50 is in the non-driving state (Y in step S106 in FIG. 4), the determination unit 660 sends information about the command signal stored in the memory unit 670 to the control unit 650. In accordance with this, the switch 610 receives a control signal from the control unit 650 and changes the terminal connected to the third terminal 613 from the second terminal 612 to the first terminal 611 (step S102 in FIG. 4). Then, the control unit 650 sends an output signal, which commands the drive unit 620 to output a drive signal, to the drive signal 620 (step S103 in FIG. 4). Receiving the output signal, the drive unit 620 supplies current to the winding coil 501, based on the output signal (step S104 in FIG. 4).

The output signal sent from the control unit 650 to the drive unit 620 is a signal that is generated based on information about the direction of swinging of the light control means 300 contained in the command signal stored in the memory unit 670. This signal is, for example, a signal that causes the light control means 300 to swing in the direction opposite to the direction of swinging of the light control means 300 according to the command signal.

If the output signal is generated based on the command signal stored in the memory unit 670, it is possible to swing the light control means 300 taking into account the direction of swinging of the light control means 300 in the previous driving. Therefore, when swinging of the rotary shaft member 302 is detected, it is possible to return the light control means 300 to the original state with reliability. Moreover, since it is sufficient to measure the magnitude of a detection signal correlating with the amount of shift of the light control means 300, the system is stable without operation errors.

The features, operations, and advantages of the system other than those described above are the same as those in the first embodiment.

Third Embodiment

A light control system according to a third embodiment differs from the light control system according to the first embodiment in that when the power is turned on, the light control means 300 is caused to swing so as to locate the optical element 301 at the first stopping position. Except for this, the light control system according to the third embodiment has a construction same as the light control system according to the first embodiment shown in FIGS. 1 to 3 and executes processing similar to the processing according to the flow chart in FIG. 4.

In the light control system according to the third embodiment, when power is turned on with the start of power supply from the power source unit 690, a command signal for causing the light control means 300 to swing in such a way as to shift the optical element 301 to the first stopping position is sent from the command unit 640 to the control unit 650, regardless of the position of the light control means 300. It is preferred that this process be executed before the processing of step S101 in FIG. 4 is executed after the start of the operation of the system.

When power is not supplied to the light control system, it is not possible to determine where the optical element 301 is located. In view of this, the control unit 640 is adapted to send a signal for shifting the light control means 300 to the first stopping position when power is turned on regardless of the position of the light control means 300. This enables the control process to start from a state in which the position of the light control means 300 is reset. Consequently, control for swinging the light control means 300 in a desired direction can be performed with reliability, and control for detecting the rotation of the rotary shaft member 302 can be performed stably.

The features, operations, and advantages of the system other than those described above are the same as those in the first embodiment.

As described above, the light control system according to the present invention is useful for detection of displacement of the light control means due to impact or vibration acting thereon in the non-driving state and for control of the position of the light control means responsive to the detection.

The light control system according to the present invention detects electromotive force generated in the coil with rotation of the light control means in the non-driving state, and when it detects electromotive force, it supplies driving current to the coil taking into account the direction of the electromotive force, whereby the light control means can be positioned at a predetermined position effectively.

What is claimed is:

1. A light control system comprising:
   first and second substrates each having an optical aperture;
   at least one light control means provided with a magnetic rotary shaft member;
   a spacer arranged between the first substrate and the second substrate to provide a space that allows the light control means to move;
   drive means arranged on the first substrate, for causing the light control means to move with supply of current to a coil;
   command means for outputting a command signal indicating a direction of rotation of the light control means;
   detection means for detecting electromotive force generated in the coil;
   switch means for connecting the coil to the drive means in a driving state in which current is supplied to the coil and connecting the coil to the detection means in a non-driving state in which electromotive force generated in the coil is detected;
   determination means for determining a rotational state of the rotary shaft member, based on an output signal output from the detection means; and
   control means for outputting a command for causing the drive means to output a drive signal, based on an output signal output from the determination means.

2. A light control system according to claim 1, wherein when power of the light control system is turned on, the command means sends a command signal to the control means so as to cause the light control means to shift to a first stopping position.

3. A light control system according to claim 1, comprising memory means for storing an output from the command means, wherein when a signal output from the determination means is input to the control means, a signal output from the control means is determined based on information stored in the memory means.

4. A light control system according to claim 3, wherein when power of the light control system is turned on, the command means sends a command signal to the control means so as to cause the light control means to shift to a first stopping position.

* * * * *